(No Model.)
P. HANSON.
CUTTING MECHANISM FOR HARVESTERS.
No. 395,493. Patented Jan. 1, 1889.
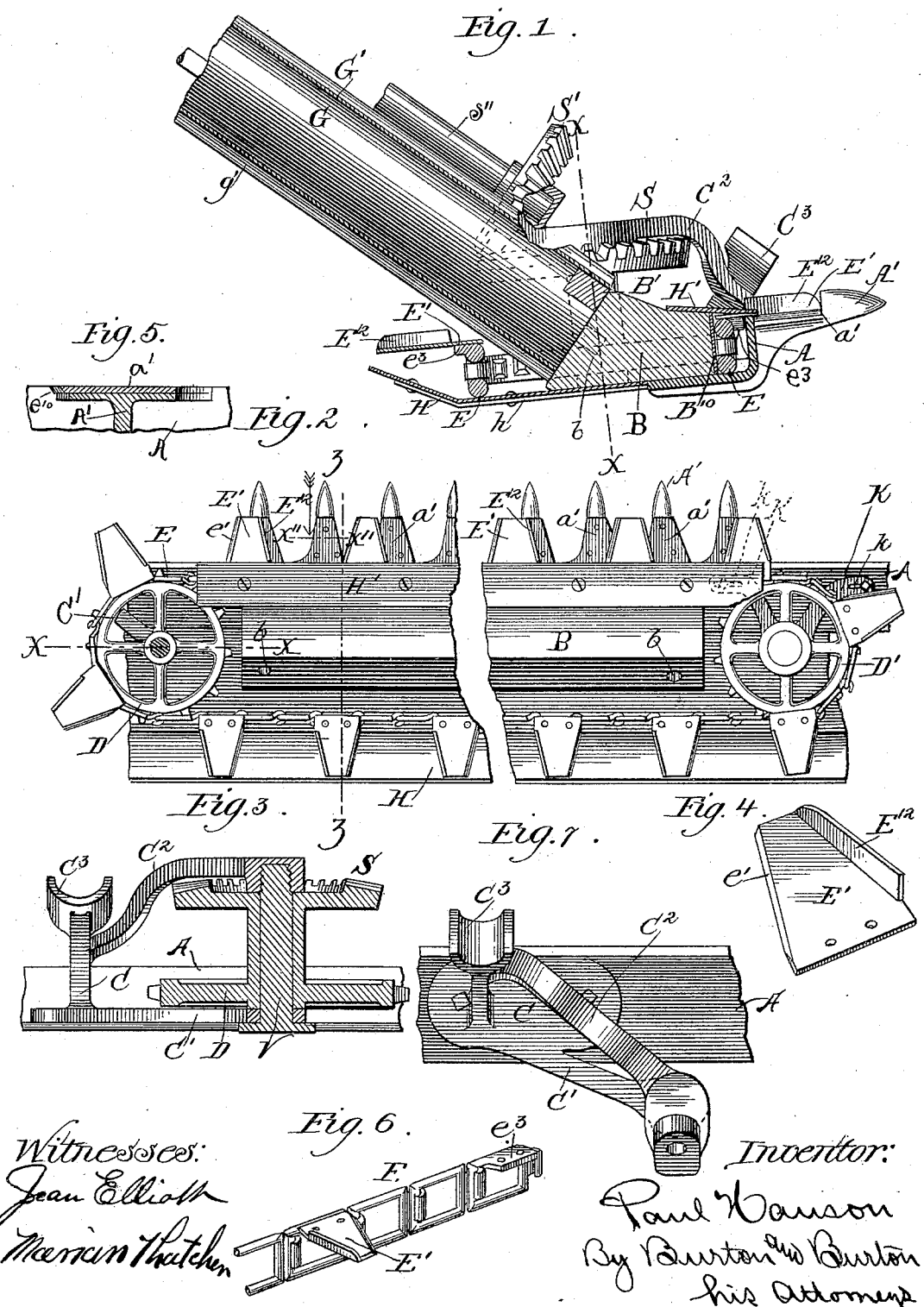
Witnesses:
Jean Elliott
Marian Thatcher
Inventor:
Paul Hanson
By Burton and Burton
his Attorneys

UNITED STATES PATENT OFFICE.

PAUL HANSON, OF ST. PAUL, MINNESOTA.

CUTTING MECHANISM FOR HARVESTERS.

SPECIFICATION forming part of Letters Patent No. 395,493, dated January 1, 1889.

Application filed September 24, 1887. Serial No. 250,624. (No model.)

*To all whom it may concern:*

Be it known that I, PAUL HANSON, a citizen of the United States, residing at St. Paul, in the county of Ramsey and State of Minnesota, have invented certain new and useful Improvements in Cutting Mechanism for Harvesters, which is set forth in the following specification, reference being had to the accompanying drawings, forming part thereof, wherein—

Figure 1 is a vertical section transverse to the finger-bar on the line $z$ $z$, Fig. 2. Fig. 2 is a plan of the cutting mechanism, the conveyer and platform being removed. Fig. 3 is a vertical section on the line $x$ $x$ of Figs. 1 and 2. Fig. 4 is a perspective of one of the knives of the cutter. Fig. 5 is a section on line $x''$ $x''$, Fig. 2. Fig. 6 is a perspective of several consecutive links of the knife-carrying chain, one of the knives being shown secured thereon and one of the links adapted to hold a knife being shown with the knife removed. Fig. 7 is a plan of a bracket which is secured to the finger-bar and which supports certain of the cutter-driving mechanism.

In general, the character of this cutting mechanism is an endless chain carrying suitable knives and continuously revolved around horizontal sprocket-wheels—one at each end of the finger-bar—the knives traveling stubbleward at the forward side and resting as they travel upon the fingers of the finger-bar, which constitute thus one member of a shearing device, of which the knives constitute the other member.

This invention consists in the details of this structure and the specific construction of the knives, fingers, and supporting, guarding, and operating parts, and in the relation of the whole to the grain supporting and conveying mechanism behind the cutter.

A is the finger-bar, which is made of angle-iron.

A' are the guard-fingers attached to the finger-bar.

B is a plank, which is secured upon the horizontal lip of the finger-bar within the angle of the angle-iron. This plank has the journal-bearings $b$ $b$ for the forward ends of the rollers, and constitutes a stop-bar for the canvas belt of the conveyer. The rear upper edge of the plank may be beveled off, as shown in Fig. 1, to save unnecessary weight; but if this is done it is preferable to attach to the plank the strip B' to support the upper ply of the conveyer-canvas.

C is a bracket, which is secured to the finger-bar at a point stubbleward from the inner end of the cut, on which is journaled the sprocket-wheel D, which drives the cutter-chain E. The sprocket-wheel D has integral with it the beveled gear-wheel S, which meshes with and is driven by the beveled gear-wheel S', whose shaft S'' is also journaled at the forward end in the bracket C, said shaft receiving power in convenient manner from the harvester-train. The bracket C is secured to the finger-bar A at a point stubbleward from the sprocket-wheel D, and has two arms, C' and $C^2$, which reach obliquely rearward and grainward—the former below the sprocket-wheel D and the latter above the gear-wheel S—and a vertical pin, V, which connects the two arms, forms the bearing of the wheels D S, as seen in Fig. 3. The same bracket, C, affords support for other parts of the harvester-frame, the seat $C^3$ at the forward inner part having such a function; but this does not pertain to the present invention. It is, however, fully described in my application, No. 248,902, filed September 5, 1887.

D' is an idle sprocket-wheel suitably journaled at the grain end of the stop-bar, around which said chain passes at the grain end.

E' are knives by which the grain is cut. They are secured rigidly upon links of the chain E, being preferably riveted or bolted upon the upper bars of the links, respectively, and projecting outward horizontally, so that they run above the fingers A'. Upon the upper surfaces of said fingers are fastened steel plates $a'$, which form the surfaces over and resting upon which the knives move. The knives E' are beveled upon the upper surface at the edge $e'$, which travels foremost, and the plates $a'$ are beveled upon the lower surface of the grainward edge $e^{10}$, though it may be found sufficient to make the edge simply a square corner. The fingers A' have no upper guard, but project forward in the usual point or prow. In order to cause the knives to run accurately and not be pushed back by the grain when the cutting-edge encounters it, I make the links to which knives are attached with wide upper bars, $e^3$, which fill the entire width of the channel in which the chain runs, and to afford a proper surface against which such links may bear as they thus run I sheath the forward edge of the stop-bar with a sheet-metal plate, $B^{10}$. The vertical lip of the angle-iron finger-bar forms the front wall of the chain-channel and needs no protection.

In order to keep the knives $E'$ close down upon the plates $a'$ as they run, and prevent the straw from wedging them up and preventing or diminishing their cutting effectiveness, I provide the plate $H'$, secured upon the upper surface of the stop-bar and projecting forward above the chain and knives fastened onto it and overhanging the upper edge of the vertical lip of the angle-iron finger-bar, over which edge the knives reach forward to rest upon the fingers. This plate is set slightly aslant, so that its forward edge bears upon the knives directly above the said lip of the finger-bar, and so tends to hold the knives down onto the finger-plates $a'$.

In order to sheath the chain in its return course, a sheet-metal plate, H, is secured to the under side of the stop-bar B and extended rearward under the chain, and as far as necessary, to guard both the chain and the knives thereon. Stiffening-ribs $h$ are fastened under said sheet-metal plate to keep it in proper form.

The conveyer and platform extend upward at an oblique angle in the rear of the cutter—that is to say, in the rear of the front ply of the cutter-chain—the returning ply of the chain passing under and behind the lower and forward side of the conveyer, as appears in Fig. 1.

G is the conveyer driving-roller. $G'$ is the conveyer proper, being an endless belt provided with slats $g'$, in the usual manner.

As the grain is severed and falls backward upon the conveyer, on account of the inclination of the latter it requires support at the butt-ends, and such support is afforded by the stop-bar B and the plate $H'$, the latter reaching forward to the very edges of the knives. To assist in carrying the grain after it is severed, and particularly to prevent the retardment of the butts, which is especially likely to occur on account of the inclination of the conveyer-platform, which causes the weight of the grain to rest largely upon the butt-ends of the grain, I make each knife $E'$ with a flange or lip, $E^{12}$, standing up along the back or non-cutting edge. As the grain is severed it rests on the upper surface of the knife, and is engaged by the flange $E^{12}$ and carried along at the speed of the chain E, which is substantially the speed also of the conveyer-belt.

The chain E and the conveyer $G'$ are actuated by power communicated in any convenient manner from the driving-wheel of the harvester to the shafts of the sprocket-wheel D and conveyer-driving roller G.

In order to provide for adjusting the chain-wheel at the grain end of the finger-bar to keep the chain running taut, I journal said wheel on a bracket, K, which is secured to the finger-bar by bolts which pass through the elongated holes $k$ in the base of the bracket.

I claim—

1. In combination with the endless chain carrying the grain-cutting knives, the stop-bar B, located between the two plies of the chain and having its rear edge beveled at the upper side, and the conveyer having its front side abutting against the said rear beveled edge of the stop-bar between the two plies of the cutter-chain and extending obliquely backward therefrom, substantially as set forth.

2. In combination with the finger-bar and the forwardly-projecting fingers thereon, the endless chain having its forward ply moving always stubbleward, said chain having knives which project forward and run upon the top of the fingers, said knives having each a cutting-edge at the stubbleward side, and having a flange projecting from their upper surfaces, respectively, and located directly grainward from the vertical plane of the cutting-edge when the knife is traveling stubbleward, substantially as set forth.

3. In combination, substantially as set forth, the angle-iron finger-bar, the stop-bar B, having its rear edge beveled on the upper side, secured to the horizontal lip of the angle-iron at a short distance back from the vertical lip of the angle-iron, the sprocket-wheels located in the horizontal plane of the stop-bar, at the ends thereof, the fingers secured to the finger-bar on the forward side, the chain carried by the sprocket-wheels and traveling around the stop-bar, and carrying knives which project forward over the edge of the vertical lip of the finger-bar, and the conveyer whose forward side abuts against the beveled rear edge of the stop-bar between the two plies of the cutter-chain, and which slopes obliquely upward and rearward over the rear ply thereof.

PAUL HANSON.

Witnesses:
FRED GERLACH,
CHAS. S. BURTON.